United States Patent

[11] 3,581,007

[72] Inventor Pierre Cassagne
Asnieres, France

[21] Appl. No. 880,484
[22] Filed Dec. 10, 1969
[45] Patented May 25, 1971
[73] Assignee Compagnie Francaise De Television
[32] Priority Sept. 27, 1965
[33] France
[31] 32,811
Continuation of application Ser. No. 582,013, Sept. 26, 1966, now abandoned.

[54] MAGNETIC RECORDING AND REPRODUCING APPARATUS FOR COLOR TELEVISION SIGNALS USING A FREQUENCY MODULATED SUBCARRIER FOR THE TRANSMISSION OF THE COLOR INFORMATION
1 Claim, 4 Drawing Figs.

[52] U.S. Cl. 178/5.4
[51] Int. Cl. H04n 9/36
[50] Field of Search 178/5.4, 5.4 (CR), 5.4 (12), 6.6 (A)

[56] References Cited

UNITED STATES PATENTS

| | | | |
|---|---|---|---|
| 2,907,818 | 10/1959 | Wetzel | 178/6.6 |
| 2,909,596 | 10/1959 | Fay | 178/6.6 |
| 2,954,441 | 9/1960 | Anderson | 179/100.2 |

*Primary Examiner*—Robert L. Griffin
*Assistant Examiner*—Richard P. Lange
*Attorney*—Kurt Kelman

ABSTRACT: Magnetic recording and reproducing apparatus for a SECAM-type color television signal comprising a frequency modulated color subcarrier, wherein the color subcarrier is separated, brought to a constant amplitude and recorded together with either an auxiliary carrier frequency modulated by the lower frequency luminance components, or with the attenuated lower frequency luminance components themselves.

INVENTOR
PIERRE CASSAGNE
By [signature]
AGENT

INVENTOR
PIERRE CASSAGNE
By
AGENT

MAGNETIC RECORDING AND REPRODUCING APPARATUS FOR COLOR TELEVISION SIGNALS USING A FREQUENCY MODULATED SUBCARRIER FOR THE TRANSMISSION OF THE COLOR INFORMATION

This is a continuation of application Ser. No. 582,013 filed Sept. 26, 1966 now abandoned.

The present invention has for its object a simplified, low cost apparatus for recording picture information contained in a composite video signal of a sequential-simultaneous system with a memory, i.e. a SECAM-type system as operating with a frequency-modulated subcarrier.

In this system, the composite video signal comprises a luminance signal, and a subcarrier, which is alternately frequency-modulated by two color signals alternating at the line frequency. The spectrum of the frequency-modulated subcarrier is located in the upper region of the frequency bandwidth of the composite video signal, and, generally, superimposed onto luminance components.

Preferably, within a system for protecting the color information from noise, the frequency-modulated subcarrier, is, before it is added to the luminance signal, passed through a filter, referred to as a coding filter, whose gain increases strongly on either side of a predetermined frequency of the subcarrier channel.

Passing the subcarrier through the coding filter impresses onto the subcarrier an additional amplitude and phase modulation. In the receiver, the subcarrier is applied to a filter, referred to as a decoding filter, to compensate for the amplitude and phase distortion, and, in particular, to restore a constant amplitude to the subcarrier.

The difficulties, as concerns the magnetic recording of a video signal are mainly the following:

a. the shape of the frequency-response characteristic of the recording and reproducing or playback device, which is such that the necessary correction for amplitude distortion can practically be performed only in a frequency range comprising a limited number of octaves, for example about 10;

b. nonlinearity of the writing and reading device;

c. the high speed of the motion of the magnetic heads relative to the recording medium which is required for the recording of components of higher frequencies;

d. to a lesser degree, the inadequate response of the recording apparatus to very low frequency components.

In order to remedy to drawbacks noted as above as (a), (b) and (d), it is known to record the video signal, which it is desired to store, in the form of an auxiliary carrier wave frequency-modulated by the signal. But this increases difficulty (c) noted above, and thus requires a delicate and expensive mechanical device for obtaining high and stable speeds for the motion of the magnetic heads relatively to the writing medium.

On the other hand, in the case of color television, the presence of the modulated subcarrier, due the nonlinearity of the apparatus, leads to defects which cause moire effects in the picture reproduced by means of the recorded signals, if the corrections for nonlinearity are not effected with the greatest precision.

Another known method for recording a signal comprising low frequency components, which method is generally used for recording audiofrequency signals, consists in adding to this signal a bias voltage having a sinusoidal waveshape. Experience shows that this method remedies to a large measure difficulties (b) and (d), but does not remedy difficulty (a).

The present invention takes advantage of the fact that in the color television system here considered, the color information is carried by the frequency-modulation of the subcarrier, whose spectrum does not reach the lower frequencies. It is then sufficient that the color subcarrier be recorded unchanged for the color information to be preserved as correctly as it is for the whole of the video signal in the known art using frequency modulation.

In what follows, there will be considered, by way of a nonlimitative example, an input video signal comprising a 5.5 M.C.P.S. luminance signal and a color subcarrier C superimposed thereon in a color channel extending from 3.5 to 4.8 M.C.P.S.

FIG. 1 is an explanatory figure showing the frequency-response curves $a(f)$ of two filters by means of which this video signal may be separated into two complementary signals A and B, the latter including the whole of the channel of the subcarrier C, and the former extending over a frequency band from 0 to an upper frequency $F_c$, which, in FIG. 1, is of the order of magnitude of 2.5 M.C.P.S.

It has been said hereinabove that the modulated subcarrier C could be recorded without transformation. The same practically applies for the luminance components included in signal B, whose frequencies are comparatively high. However, the storage of signal A belongs to the technique of a video signal comprising lower frequency components.

One solution would consist in writing signal B, as such, on one track, and signal A, under the form of a frequency-modulated wave, an another track. But this solution is not suitable for a simplified apparatus.

Another solution would be to effect the frequency modulation of a carrier wave by signal A in such a way that the frequency band of the FM wave would be above that of signal B. But then, the above-mentioned difficulty (c) is met with.

The simplified magnetic recording method according to the invention allows, at the cost of an eventual loss of horizontal definition of the luminance signal, the recording of the luminance and color information contained in the input video signal on a single track, and in a frequency band which does not exceed that of the input signal. This results in structure which is greatly simplified and very reliable in operation. In this invention, two signals L and H having a spectrum respectively approximating that of two complementary signals A and B such as those of FIG. 1, are distinguished in the input video signal.

It is an object of the present invention to provide a single track magnetic recording apparatus in which the composite video signal to be recorded is separated into two components: the first one comprising the lower frequency components of the luminance signal; and, the second one comprising at least the frequency modulated color subcarrier; the subcarrier being brought to a constant amplitude and recorded unchanged together with an auxiliary carrier, frequency modulated by the first component.

It is another object of the present invention to provide a single track magnetic recording apparatus in which the composite video signal to be recorded is separated into two components: the first one comprising the lower frequency components of the luminance signal; and, the second one comprising the subcarrier, the subcarrier being brought to a constant amplitude and the recorded unchanged and simultaneously used as a high frequency bias signal for directly recording the lower frequency components suitably attenuated with respect to the constant amplitude subcarrier.

It is a further object of the present invention to provide magnetic reproducing apparatus for the recording obtained in the above-described manners.

It is another object of the present invention to provide a device that is economical to build and reliable in operation.

The invention will be better understood with the aid of the following description and the drawings relating to it, in which.

Figure 2:
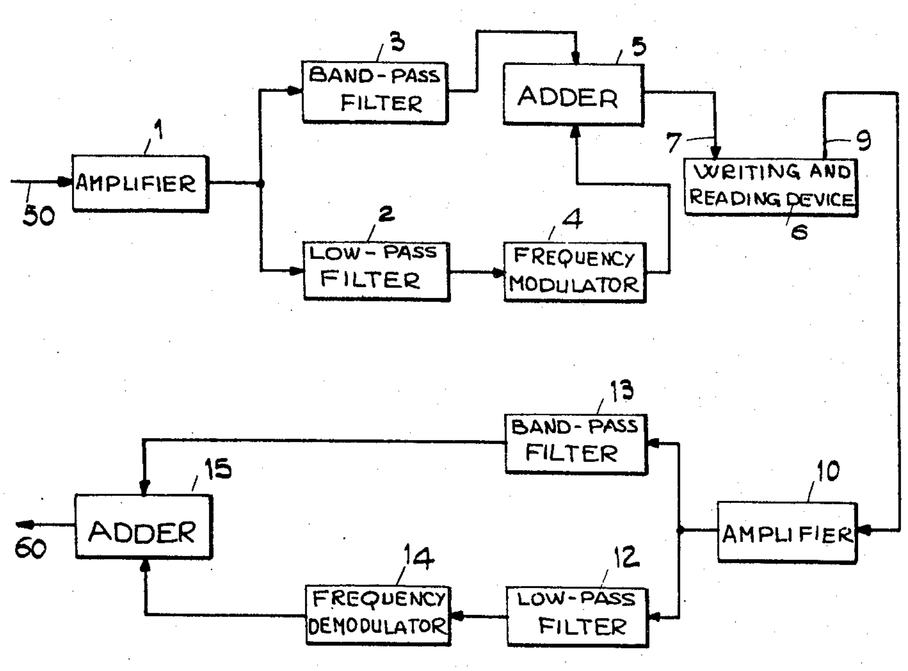
FIG. 2 is the block diagram of a first embodiment of an apparatus in accordance with the invention, built up by a wave frequency-modulated by signal L.

In FIG. 2, which illustrates a first embodiment of an apparatus in accordance with the invention, there is shown at 50 the input of the apparatus, to which is applied the input video signal.

The input 50 feeds an amplifier 1, the output of which feeds in parallel a high pass (or band-pass) filter 3 supplying signal H and a low-pass filter 2 supplying signal L.

Signal L supplied by filter 2 is applied to the modulation input of frequency modulating means 4, comprising an output filter, and supplying signal L′ built up by a wave frequency-modulated by signal L.

It may be recalled that in principle the useful spectrum of a frequency-modulated wave is frequently taken as the frequency swing interval (interval covered by the instantaneous frequencies) bordered by two marginal bands.

It is sufficient, for a satisfactory restitution of the signal, that one of the two marginal bands should have a sufficient width, the minimal width of this marginal band depending upon the bandwidth of the modulating signal on the one hand, and upon the modulation index, on the other hand; the other marginal band may then be very narrow.

In the present case, one is led to using a wide lower marginal band and a very narrow upper marginal band.

A possible choice of signals L, H and L′ will be indicated for the numerical data given hereinabove.

The frequency band of signal L extends from 0 to 2 M.C.P.S. and that of signal H from 3.5 to 5.5 M.C.P.S.

As concerns signal L, a frequency band from 0.2 M.C.P.S. to 3.3 M.C.P.S. will then be used, this, on the one hand avoiding the recording of very low frequencies, and, on the other hand, allowing a safety interval between signal L′ and signal H. This frequency band from 0.2 to 3.3 M.C.P.S. of signal L′ will include a wide lower sideband from 0.2 to 2.5 M.C.P.S., a swing from 2.5 to 3.2 M.C.P.S. and a reduced, vestegial upper sideband from 3.2 to 3.3 M.C.P.S.

In order to obtain more easily a satisfactory linearity of the frequency modulation, and to eliminate the modulating signal from the spectrum of the modulated signal, it is preferred to use a known artifice, consisting in effecting the frequency modulation in a higher frequency band, for example with a frequency swing extending from 52.5 to 53.2 M.C.P.S., the modulated wave thus obtained being thereafter translated to the lower frequency band through mixing in with a sinusoidal wave of 50 M.C.P.S.

Signal H supplied by filter 3 and signal L′ supplied by the frequency modulator 4 are applied to the two inputs of an adder 5 supplying the signal to be recorded.

To this end, the output of the adder 5 is connected to the input 7 of the recording and reproducing or playback apparatus 6, comprising the magnetic heads and their associated circuits, and restoring at its output 9, on reading, the signal previously applied to input 7. Apparatus 6 can be of any suitable type.

The output 9 of the apparatus 6 is connected to the input of an amplifier 10.

In the figure the recording-reproducing or playback switching devices have not been shown.

Amplifier 10 feeds two filters 12 and 13 in parallel.

The pass-band of filter 13 is the same as that of filter 3.

Filter 12 is a low-pass filter whose pass-band covers the useful spectrum, defined earlier, of the auxiliarly frequency-modulated carrier forming the signal L′.

The output of filter 12 is connected to the input of a frequency demodulator 14 supplying signal L.

An adder 15 has its two inputs connected to the outputs of filter 13 and of the frequency demodulator 14 respectively. The output 60 of the adder 15 provides the output video signal of the apparatus.

It will be seen readily that, in the example considered here, the reproduced luminance signal, while being usable, has suffered a loss of definition.

It is possible to give to signal L a wider frequency band, but at the cost of a reduction of the modulation index. Another solution consists, after signal L′ has been demodulated, to complete signal L, before it is added to signal H, by the crispening method. This method, as is known, consists in adding to the signal of which it is desired to increase the apparent definition, components of higher frequencies, essentially obtained through differentiation of this signal.

If the subcarrier included in the input video signal was fed to a coding filter before it was added to the luminance signal, the operation of the apparatus of FIG. 2 would be improved if the subcarrier were brought back to a constant amplitude by means of a decoding filter, which may be combined with filter 3; a coding filter can then be inserted in the output circuit, the coding filter being advantageously combined with filter 13.

Figure 1:
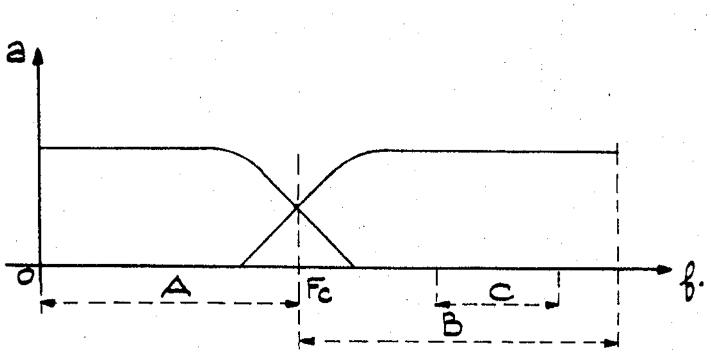
FIG. 1 is the above-mentioned explanatory diagram.
Figure 3:
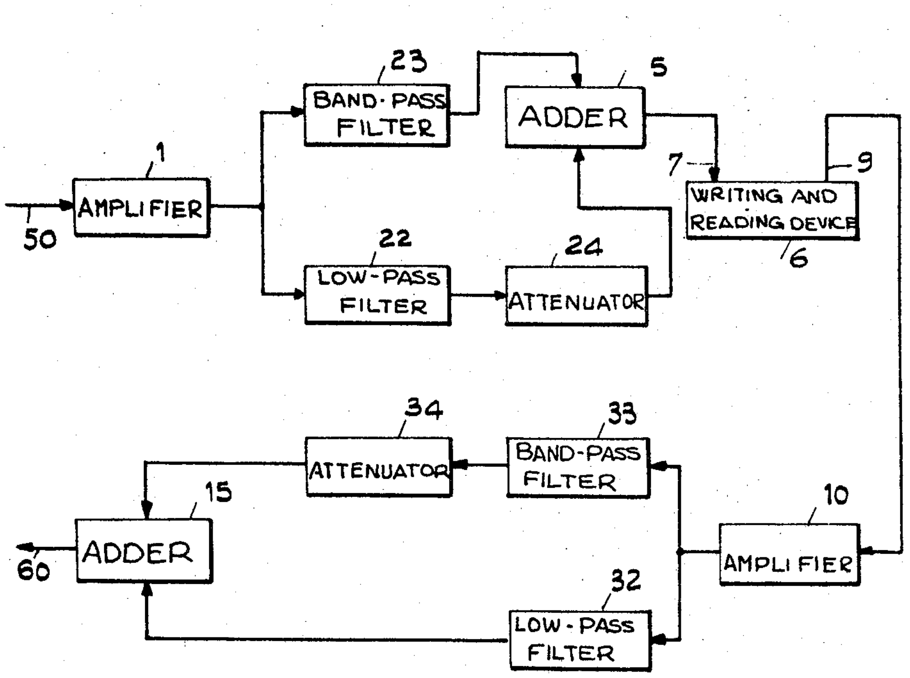
FIGS. 3 and 4 are the block diagrams of two further embodiments of an apparatus according to the invention using a signal L′ obtained through attenuating signal L relatively to signal H.

FIG. 3 shows another embodiment of the apparatus according to the invention, in which elements 50, 1, 5, 6, 7, 9, 10, 15 and 60, identified by the same numbers as in FIG. 1, have the same significance.

Amplifier 1 feeds, in parallel two filters 22 and 23, respectively supplying signals L and H, the first signal covering, for example, a band from 0 to 2 mHz. and the second one the band of the subcarrier C, i.e. 3.5 to 4.8 M.C.P.S.

The output of filter 23, supplying signal H, is connected to one of the inputs of the adder 5, the other input of which is connected to the output of filter 22, providing signal L, through an attenuator 24.

The remainder of the input circuit (circuit preceding the recording and reproducing or playback device is unchanged from FIG. 1.

In the output circuit (following the writing and reading device) the two channels connecting amplifier 10 to the two inputs of the adder 15, are made up as follows:

One channel comprises a low-pass filter 32, with the same bandwidth as filter 22, and the other a filter 33, with the same bandwidth as filter 23, followed by an attenuator 34.

The purpose of attenuator 24 is to reduce the level of signal L with respect to the frequency-modulated subcarrier included in signal H sufficiently to enable this subcarrier to act, with respect to signal L, as the auxiliary high frequency oscillation, which as is known, may be added to a signal, as recalled above, to facilitate the magnetic recording thereof.

Attenuator 34 is used to restore the correct ratio between the values of signals L and H.

It should be pointed out that in standard practice the auxiliary high frequency oscillation is a pure sinusoidal oscillation of constant amplitude. It is easy to see that the frequency modulation of the subcarrier does not adversely affects the part which it is to play in this respect. However, amplitude modulation would introduce distortion.

As the coding filter imparts an amplitude modulation to the subcarrier, it is necessary, if the subcarrier of the input signal is passed through a coding filter, to bring back the amplitude of the subcarrier to a constant value by using in the input circuit a decoding filter, which can for example be inserted between filter 23 and the adder 5, or combined in a single filter with filter 23. A coding filter can then be inserted in the channel containing attenuator 34 and filter 33, or combined with the latter.

It is of course understood that attenuator 24 can be replaced by an amplifier inserted, for example, between filter 23 and adder 5, and attenuator 34 by an amplifier inserted, for example, between filter 32 and adder 15.

On the other hand, if the level of adjustment of attenuators 24 and 34 is fixed, these attenuators can be combined with the filter(s) of their respective channels.

Here again, a crispening circuit may be used, it being inserted between amplifier 34 and adder 15.

Figure 4:
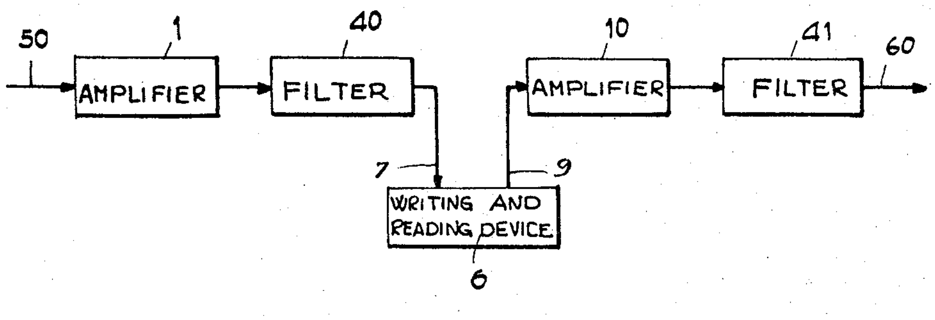

FIG. 4 illustrates a further embodiment of the device shown in FIG. 3, in which the group of elements 22, 23, 24 and 5 have been replaced by a filter 40 of suitable characteristic, in other words whose gain is approximately that of filter 23 for the frequency band of signal H and that of filter 22 multiplied by the attenuation of attenuator 24 for the frequency band of signal L.

Similarly, elements 33, 32, 34 and 15 of FIG. 3 have been replaced by a single filter 41, with opposite characteristic to that of filter 40 in the band of signals L and H.

For this apparatus to operate as that of FIG. 3, filters 40 and 41 should be in principle band rejection filters for the frequency band separating the bands of signals L and H. But it will appear immediately that it is sufficient that one of the two filters, preferably filter 41, should fulfill this condition.

Of course, each of the two filters 40 and 41 may be a composite filter, including two or more simple filters in series.

If the subcarrier of the input video signal was applied through a coding filter, a decoding and a coding filter will be again used. Those filters may be combined with filters 40 and 41 respectively.

It is here noted that in the circuits of FIGS. 2, 3 and 4, the decoding and coding filter of the known art are defined only for the channel of the subcarrier C. If the band of signal H exceeds that of signal C, the characteristics of the decoding and coding filters are not critical for those portions of the band of signal H which are outside the band of subcarrier C, but of course those characteristics should preferably compensate for each other over the whole bandwidth of signal H.

It should be understood that any filter referred to may be built up by two or more filters in series.

The color subcarrier is generally suppressed during the transmission of the sync signals. In this case, the apparatuses of FIG. 3 and 4 should be associated with a device for regenerating the sync signals, which device may be of any known type used for black and white television.

As in every apparatus for the magnetic recording of a video signal, the DC component is restored by conventional means at the output of the apparatus.

Of course the invention is not limited to the embodiments described, which were shown by way of example.

I claim:

1. In a color television recording apparatus of the type that includes circuitry connecting to a magnetic recording device, the television signal to be recorded being a SECAM-type signal including luminance information extending over a first bandwidth and chrominance information extending over a second, and narrower, bandwidth contained within said first bandwidth, towards the upper end thereof, said first bandwidth encompassing an octave range exceeding the satisfactory recording capabilities of the recording device, the improvement which comprises:

filtering means for separating said television signals into a first and a second portion, said first portion encompassing the lower frequency components of said television signal and said second portion encompassing the higher frequency components of said television signal and including at least said chrominance information, said filtering means providing a predetermined frequency gap between said first and second portions, said gap having a bandwidth which is a significant fraction of said first bandwidth;

means for frequency modulating said first portion about an auxiliary subcarrier having a frequency lying within said frequency gap; and adder circuitry for recombining said second portion and said frequency modulated first portion to provide an input signal for said recording device, the bandwidth of said recombined signal being less than said first bandwidth and encompassing a lesser octave range which falls within the satisfactory recording capabilities of said recording device, whereby said luminance information and said chrominance information are recorded.